United States Patent [19]

Bidaud et al.

[11] Patent Number: 5,767,652

[45] Date of Patent: Jun. 16, 1998

[54] METHOD AND SYSTEM FOR SUPPLYING OPTIMAL POWER TO AN INDUCTIVE-TYPE LOAD

[75] Inventors: Francis Bidaud, Duclair; Sylvain Benoit, Artas, both of France; Jacques Plisson, Barentin, France; Gerard Morizot, Villingen; Harald Roth, Munchweiler, both of Germany; Adolf Huber, Bad Durrheim, Germany

[73] Assignee: L'Unite Hermetique, La Verpilliere, France

[21] Appl. No.: 633,355

[22] Filed: Apr. 17, 1996

Related U.S. Application Data

[63] Continuation of Ser. No. 175,202, Dec. 28, 1993, Pat. No. 5,548,199.

[30] Foreign Application Priority Data

Dec. 30, 1992 [FR] France ................... 92-15909

[51] Int. Cl.$^6$ .................................................. H02P 5/34
[52] U.S. Cl. ...................... 318/802; 318/806; 318/807; 318/636; 363/49
[58] Field of Search ........................... 318/802, 807, 318/376, 809, 805, 806, 800, 801, 700, 729, 636, 138, 803, 811; 363/49, 71, 79, 34, 36, 37, 136; 64/581

[56] References Cited

U.S. PATENT DOCUMENTS

| | | |
|---|---|---|
| 4,160,940 | 7/1979 | Wolf .......................... 318/805 |
| 4,282,473 | 8/1981 | Dreiseitl et al. ............. 318/803 |
| 4,400,655 | 8/1983 | Curtiss et al. ............... 318/809 |
| 4,477,761 | 10/1984 | Wolf .......................... 318/800 |
| 4,511,830 | 4/1985 | Yamada et al. .............. 318/636 |
| 4,511,956 | 4/1985 | Dewan et al. ................ 363/49 |
| 4,533,986 | 8/1985 | Jones .......................... 318/803 |
| 4,788,493 | 11/1988 | Liptak et al. ................ 318/376 |
| 5,122,715 | 6/1992 | Kimura et al. .............. 318/254 |
| 5,216,342 | 6/1993 | Torii et al. .................. 318/609 |

*Primary Examiner*—John W. Cabeca
*Attorney, Agent, or Firm*—Oblon, Spivak, McClelland, Maier & Neustadt, P.C.

[57] ABSTRACT

The present invention relates to a method of supplying optimal power for an alternating current electric motor driven by a direct/alternating and alternating/direct/alternating static frequency converter, as well as a device implementing this method.

This method of supplying optimal power for an inductive-type load coupled to an application, this load being driven by a static converter controlled by an electronic module, this power supply method constituting the electronic load control device which, at any instant, delivers to the load, by means of setting parameters applied to the controls of the converter, a voltage, by noting the direction of variation around an extreme, corresponding to a minimum power absorbed by the load, from one or more monitoring parameters (MP) which are weighted and/or combined together.

The method of supplying optimal power, as well as the device implementing it according to the present invention, apply to all types of load of an inductive nature.

9 Claims, 11 Drawing Sheets

METHOD AND SYSTEM FOR SUPPLYING OPTIMAL POWER TO AN INDUCTIVE-TYPE LOAD

This is a Continuation of application Ser. No. 08/175,202 filed on Dec. 28, 1993, now U.S. Pat. No. 5,548,199.

I. Background of the Invention

The present invention relates to a method of supplying optimal power for an alternating current electric motor driven by a direct/alternating and alternating/direct/alternating static frequency converter, as well as a device implementing this method.

II. Description of the Prior Art

The principle of supplying power for an electric motor by means of an alternating voltage wave possibly being variable in frequency and amplitude is known. It is a question of chopping a DC voltage source in such a way as to obtain, at the terminals of the motor, a wave having a desired synthesized shape so as to match the power supply voltage of the motor to its load torque. This technique, known to the person skilled in the art, is described in a work by Yvon PEERS entitled "Speed variation". Such devices generally consist of a frequency converter controlled by a method of the pulse-width-modulation (PWM) type, this converter being placed between the power supply source and the motor driving an application.

With the aim of obtaining satisfactory efficiency in the control-motor assembly, it is known to base this management process on one or more monitoring parameters processed by a module which interprets them and derives parameters for setting up the elements of the device on the basis of optimization and/or convergence criteria. A block diagram showing the various steps of this procedure is presented in FIG. 1. On the basis of physical phenomena 11 of the device, such as current, voltage or temperature, monitoring parameters 12 are measured then shaped (block 13), compared (block 15) to datum values or optimization and/or convergence criteria (block 14), the results are then interpreted (block 16) then a decision on the possible alteration 17 of one of the setting-up parameters 18 of the device is taken and sent to the slaved device (block 19) by the corresponding control.

This slaving is generally carried out by a variation of the frequency as a function of the currents flowing in the transistors and is based on a law of the type UM=H(f, P1, P2, ..., Pn) in which Um is the synthesized voltage at the terminals of the motor, f the frequency of this voltage and P1, P2, ... Pn, monitoring parameters. This type of law, standard in the known devices, quite often leads to an oversupply for the motor and, consequently, to an oversizing of the components, hence to excess manufacturing cost. Some quasi-standard laws allow the risks of oversupply to be substantially reduced, without in any way satisfactorily eliminating these drawbacks.

Another major drawback of this type of slaving is that these parameters have to be measured by as many sensors and connection lines as there are monitoring parameters. Moreover, the optimization which is done has to take account of the tolerances of the components, such as those imposed on the capacitors, on the power transistors or on the physical characteristics of the motor, and of the dispersions in mass production of the motor and of the applications driven by the latter. In order to take account of the sum of these constraints and not to risk upsetting the operation of the control-motor-application assembly, the slaving is done in such a way that the motor supplies an actual torque which is greater than the maximum torque of the load in the operating range. This type of slaving proves to be inadequate since it does not allow optimal efficiency to be obtained in all possible cases included in the operating range. In parallel, these types of slaving lead, most of the time, to values of current drawn from the mains, during starting, of very high values. This creates a superfluous expenditure of energy and a risk of non-conformity to certain standards relating to the tolerable disturbances produced in the power supply mains.

The known devices do not make it possible to optimize the balance between the electrical device and the driven motor while satisfying the requirements of the application to be driven to produce a transferable assembly incorporating the dispersions possible in the manufacture of elements of the electronics-motor-application chain.

III. Summary of the Invention

The present invention overcomes such drawbacks by virtue of a method of supplying power allowing an automatic, continuous search for the optimal voltage-frequency pair to be delivered to the motor, on the basis of different locations of the monitoring parameters on the control-motor-application device, without, a priori, monitoring the voltage and the frequency, with the type of laws quoted above.

The present invention relates to a method of supplying optimal power for an inductive-type load coupled to an application, this load being driven by a static converter controlled by an electronic module, this power supply method constituting the electronic load control device, which, at any instant, delivers a voltage to the load, by means of setting parameters applied to the controls of the converter, by noting the direction of variation around an extreme, corresponding to a minimum power absorbed by the load, from one or more monitoring parameters (MP) which are weighted and/or combined together.

The present invention also relates to a device implementing this power supply method.

Hence, whatever the operating phase of the assembly (steady-state regime, transient regime between two operating points, starting, fluctuations around an operating point), the latter is constantly in a state corresponding to maximum efficiency.

The direct consequence is that, as the acceleration is perfectly controlled, the power absorbed by the motor is minimal at the power required by the given application, as is the current drawn from the power supply source on starting.

This makes it possible to increase the lifetime of the motor and to keep up its performance, as well as the lifetime of the power components of the converter, while optimizing the criteria for selecting the latter. The balance between the control electronics, the motor and the application is optimized, and, above all, the method according to the invention allows modification of the internal parameters of the system as a function of time and of the wear on the components without the assembly being downgraded for poor efficiency or non-conformity to the standards.

IV. Brief Description of the Drawings

The present invention will be better understood and additional advantages will appear on reading the description which will follow, illustrated by the following figures:

FIG. 1, already described, represents the general principle of a method of monitoring the power supply for a load, FIG. 2 represents the optimizing of the self-adaptive power supply for an inductive-type load according to the invention, FIG. 3a represents a diagrammatic example of the power absorbed by a load, as a function of monitoring parameters, FIG. 3b represents the table of the modes of selecting types of possible combinations of the processing of the blocks of parameters selected according to the invention.

Figure 12:
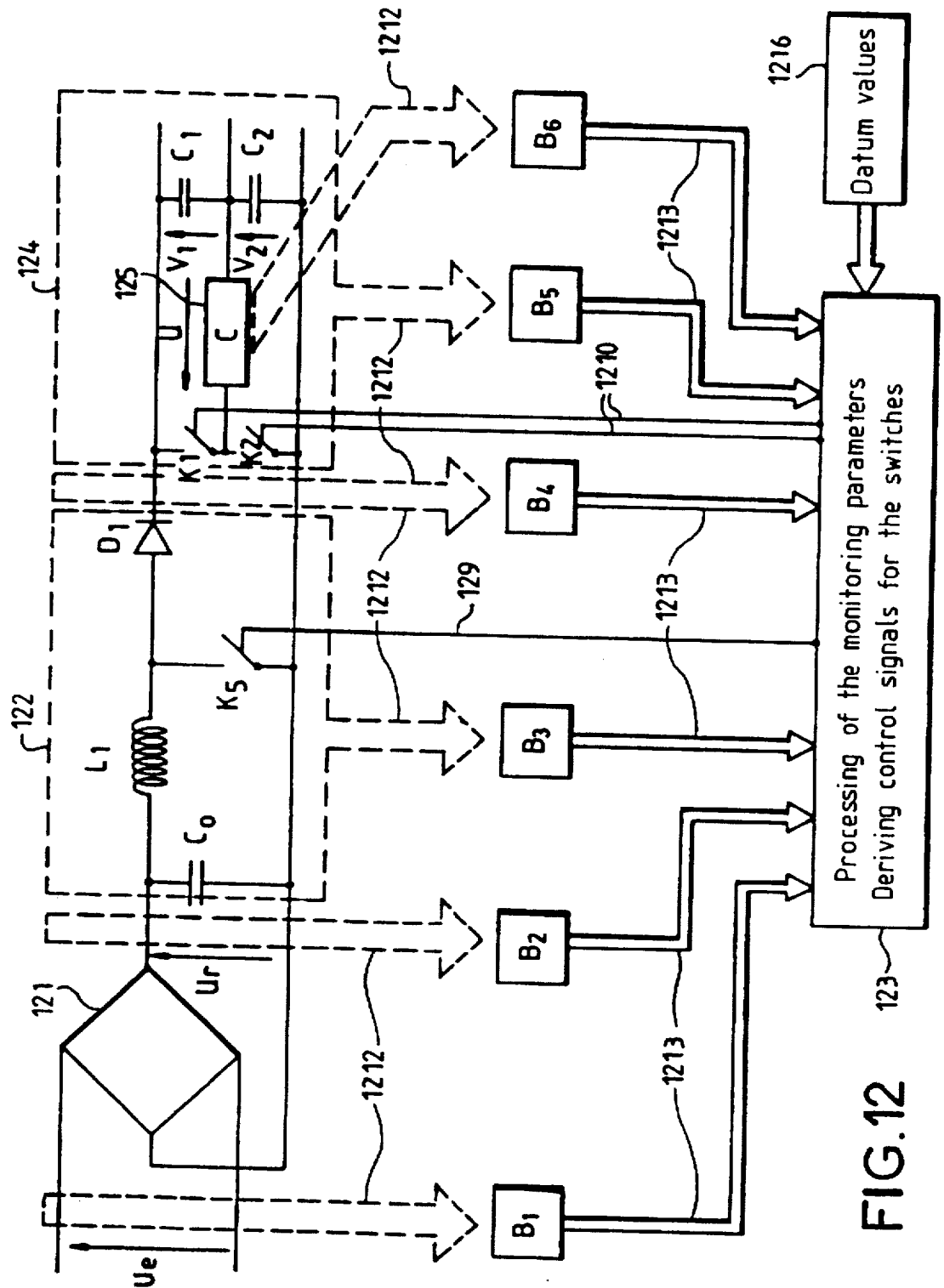

and FIG. 12 represents a preferred static frequency converter device allowing implementation of the method according to the invention.

V. Description of a Preferred Embodiment

In the description which will follow, the invention is described applied to a motor, but it is quite obvious that, by analogy, any inductive-type load may be supplied by the method according to the invention, such as, for example, static transformers, whether variable or not, or also transformers supplying one or more electric motors.

Figure 1:
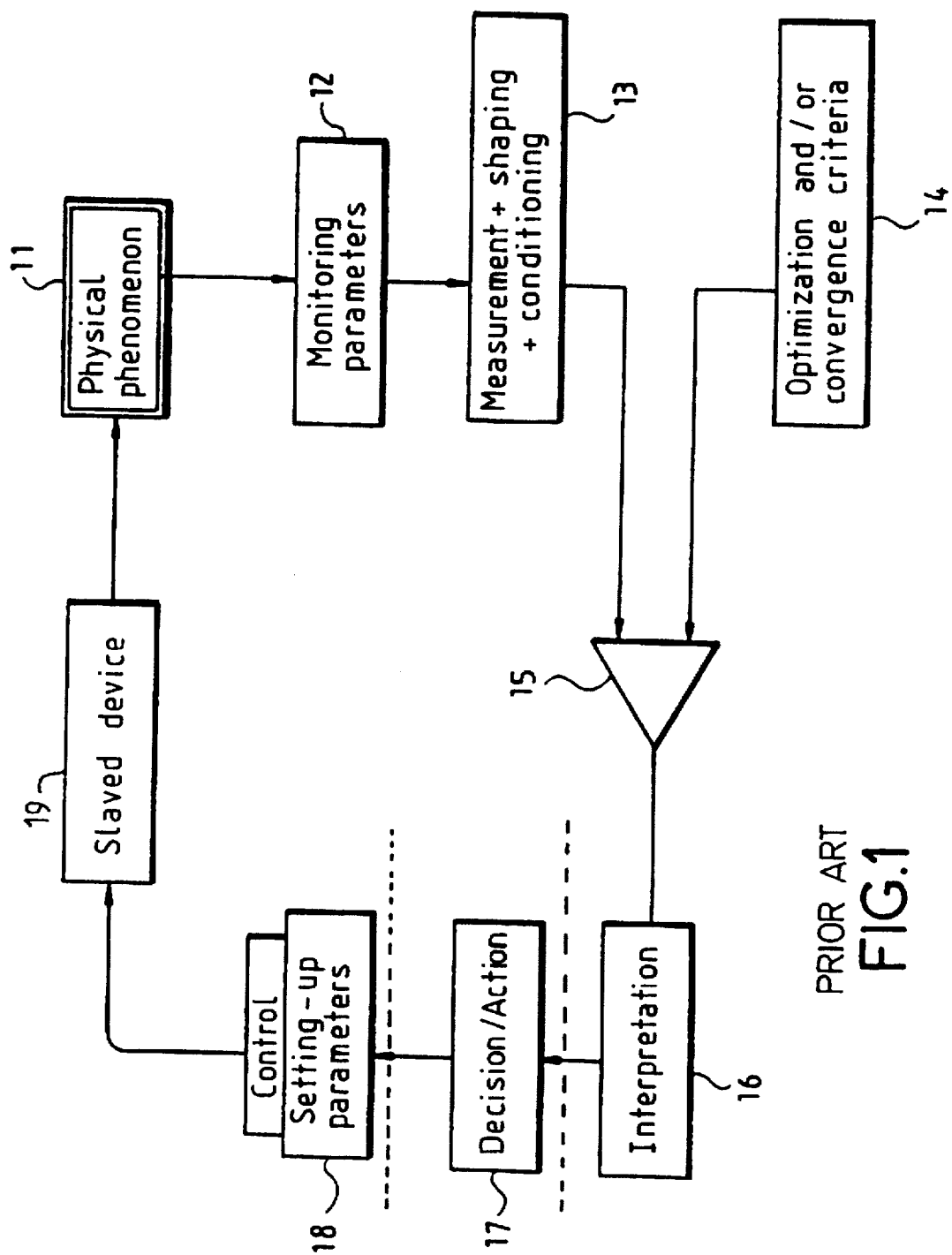
Figure 2:
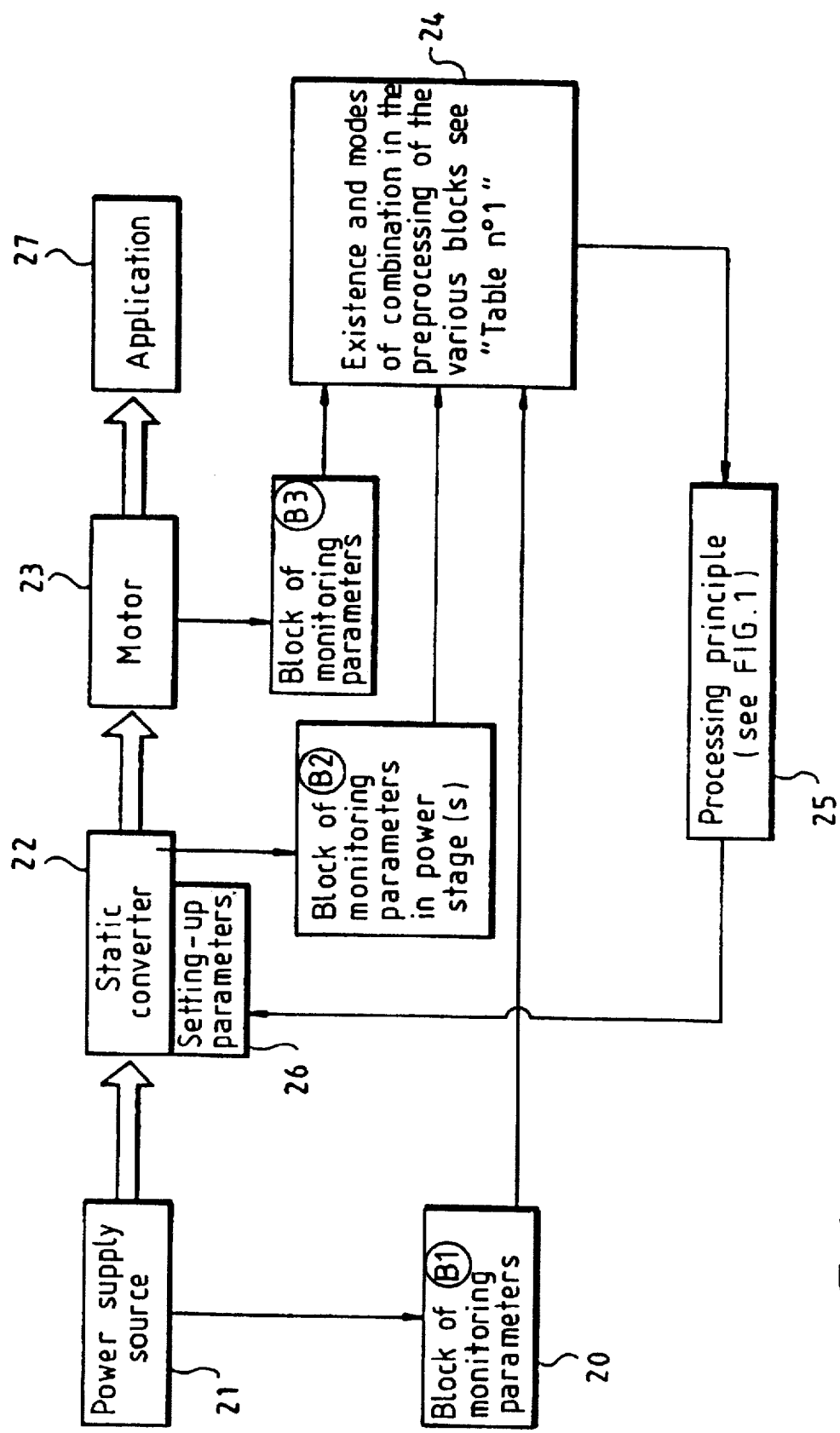

In FIG. 2, the general theoretical diagram of the automatic optimization according to the invention is represented. Monitoring parameters 20 are measured on the power supply source 21 and/or on the converter 22 and/or on the motor 23 to which the blocks of parameters B1, B2 and B3 respectively correspond. These blocks are then preprocessed by a module 24 which selects them, weights them and combines them by ORs and ANDs, then the values obtained are compared to datum values or optimization and/or convergence criteria (block 25). The results are translated into setting-up parameters 26 which are applied to the controls of the converter 22. This principle of the self-adaptive search method according to the invention offers the possibility of closer control of the control-motor assembly, which allows transferring of the control-motor assembly between several applications, since it gets round the measurement of the quantities by sensors on the application 27.

The steady-state regime of the power supply converter-motor-application source device corresponds to an operating point of the device and to a value of the voltage Um and to a value of the frequency f which are delivered to the motor.

Figure 3A:
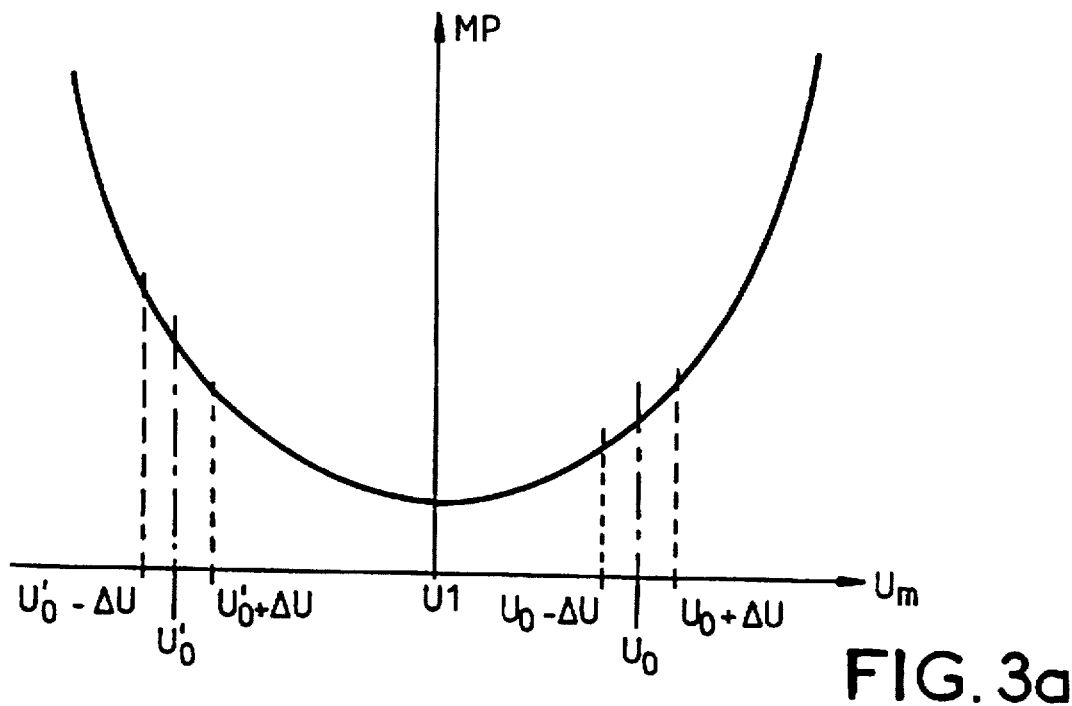

As represented in FIG. 3a, some of the monitoring parameters (MP) of the motor, with constant frequency of the motor wave and with constant load on the motor, have a concave form or exhibit an extreme as a function of the voltage Um delivered to the motor. By way of example, the minimum of absorbed power corresponds to the maximum efficiency of the motor, the minimum of current absorbed is close to the maximum efficiency of the motor, the difference being due to the apparent cos (fi) of this motor.

Figure 3B:
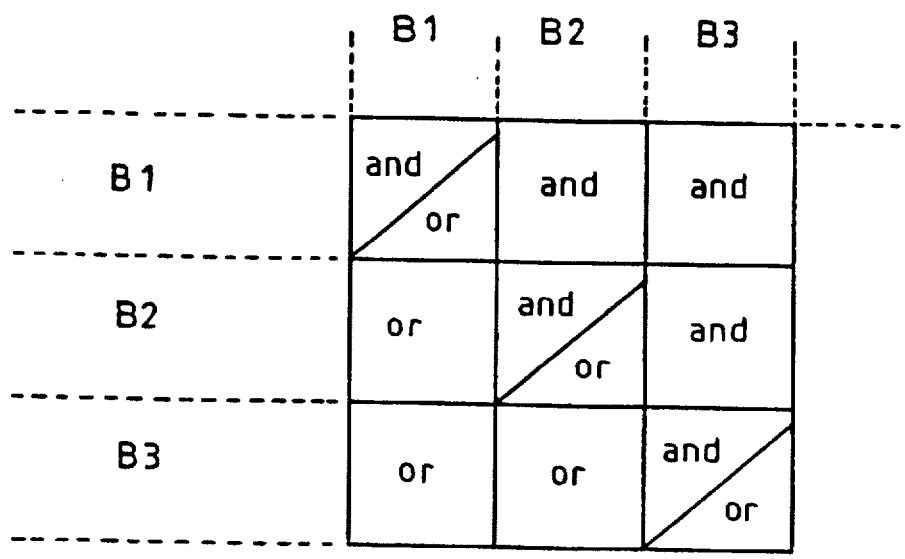

The invention consists in taking account, as monitoring parameter in the blocks B1, B2 and B3, of the respective currents and powers of the power supply source, of the converter and of the motor, and, from among these currents and powers, selecting and combining them according to the rules of the table of FIG. 3b, with or without weighting so as to slave the voltage Um delivered to the motor. According to FIG. 3a, the monitoring parameters being situated on the axis of the ordinates, the voltage U1 being the optimal voltage to be reached and the voltage U0 or U'0 the starting value of Um, the slaving from Um to U1 is done on the basis of the direction of variation of the monitoring parameter or parameters according to the curve, from the values U0 or U'0. Keeping the current absorbed as monitoring parameter makes it possible to regulate the variations in torque due to a fluctuating load, the current absorbed corresponding to these torque fluctuations. In effect, when the load fluctuates around an operating point, the current absorbed exhibits distortions such as, for example, asymmetries between positive and negative half-cycles, and the fact of regulating these asymmetries by slaving setting-up parameters of the converter makes it possible to match the motor torque to the opposing torque and limit vibrations in the assembly.

In the case of a transient regime, such as, for example, passing from one steady-state regime, corresponding to a first operating point, to another steady-state regime corresponding to a second operating point, due to alterations in the behavior of the application itself or due to alterations demanded by the user of the device, it is preferable never to underpower the motor whatever the variation in operating points demanded or noted, at the risk of stalling the motor. Two cases can be presented according to the values of variations df in the frequency f and dUm in the voltage Um. These frequency df and voltage dUm variations can be done in one or more steps.

A motor operating in normal conditions is supplied by a voltage Um which brings its operating torque to an operating value which is lower than that of its drop-out torque for the frequency at which it is working. The offset dC between the operating torque and the drop-out torque stems from the good balance between the internal parameters defining the motor and the method of supplying optimal power in steady-state regime according to the invention.

Modifying the frequency of the power supply wave for the motor, by application of a df>0 or of a df<0, without altering the voltage value Um delivered to the motor has the effect of reducing or increasing the offset dC respectively.

Figure 4A:
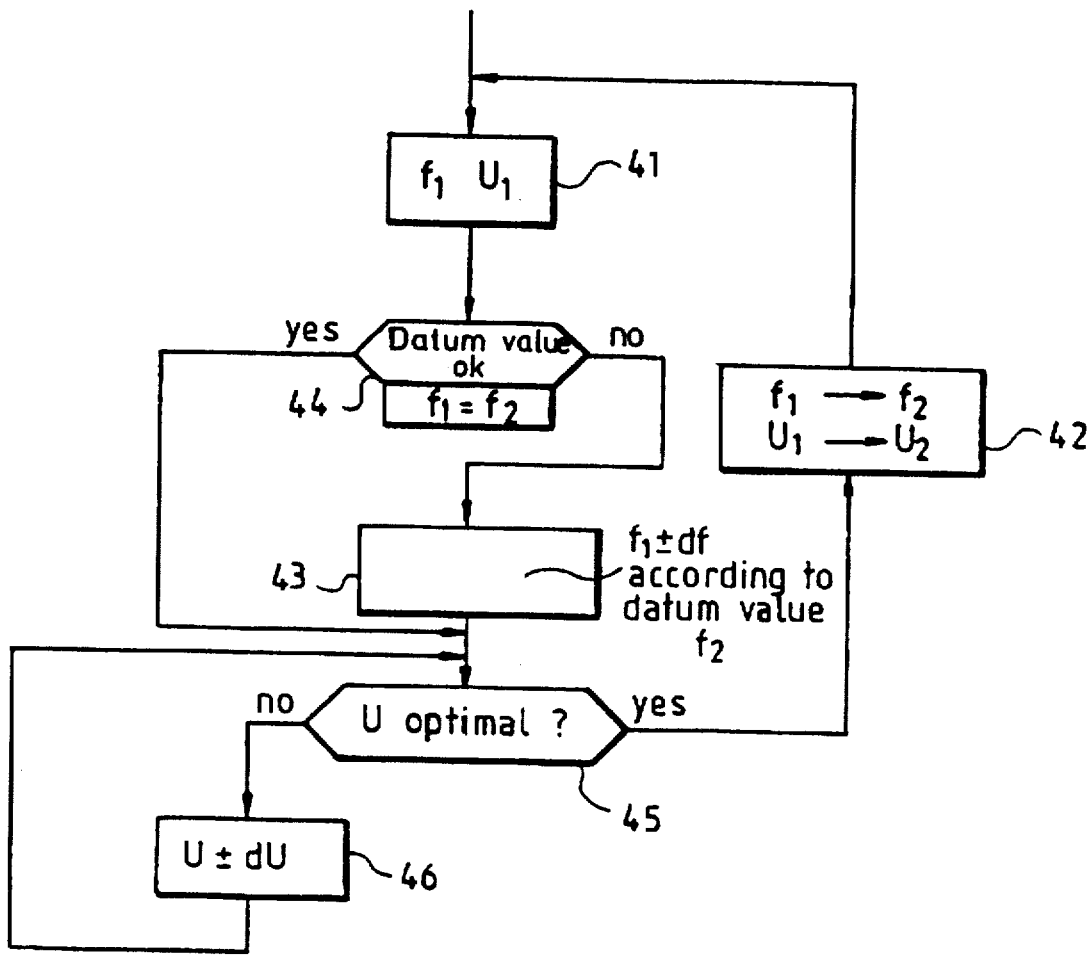
FIG. 4a represents a flow chart according to the invention for changing from one steady-state regime to another steady-state regime for small variations in the frequency or in the voltage at the terminals of a load.
Figure 4B:
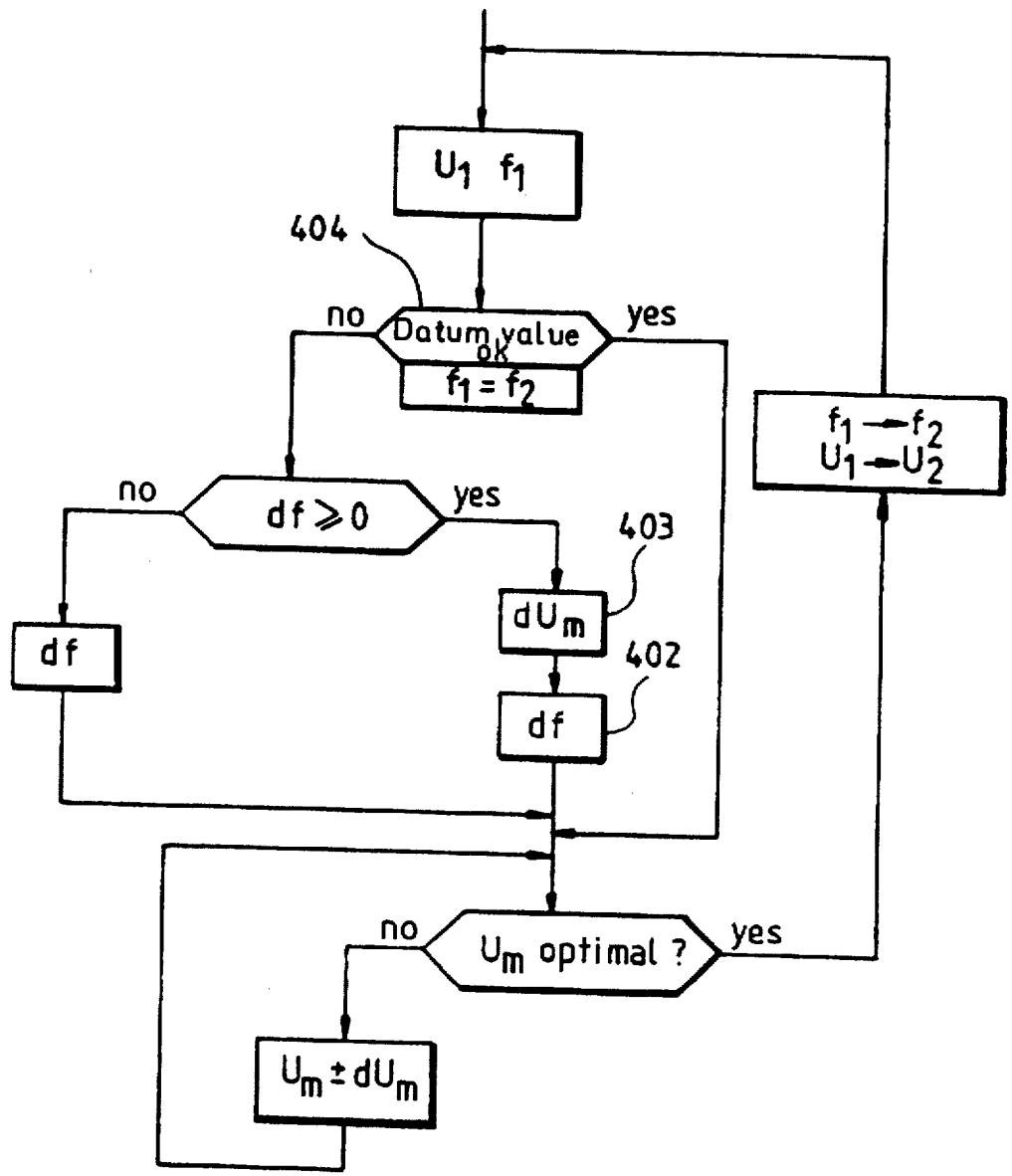
FIG. 4b represents a flow chart according to the invention for changing from one steady-state regime to another steady-state regime for large variations in the frequency or in the voltage at the terminals of a load.

In the case in which df>0 it is important to ensure that dC does not become too small, which would have the effect of compromising the stability of the motor. Two cases can be presented:

for sufficiently small values of df, it is possible to vary the frequency f and the voltage Um in one direction or in any order without risking underpowering the motor. This first case is illustrated by FIG. 4a which represents a flow chart for passing from one steady-state regime 1 corresponding to the voltage/frequency state 41 (U1,f1) of the motor, to another steady-state regime 2 corresponding to state 42 (U2,f2). The frequency f1 is accompanied by a variation df (block 43) up to the value f2 according to the datum values 44 demanded, either by the user, or by self-adaptive management when the application is altered by itself. The value of the voltage U1 is accompanied by dU up to the value U2 corresponding to the optimal value 45 of the voltage of the operating point 2 of the state (U2,f2).

for larger values of df, corresponding to a dC which might risk compromising the stability of the motor, priority has to be granted to dUm, so as not to risk underpowering the motor. In effect, increasing the frequency by such a value df, without anticipation by an increase dUm, risks underpowering the motor. This is what FIG. 4b illustrates, in which, when the datum value entered in block 404 is to increase the frequency (df>0), the voltage is first of all altered (block 403) then the frequency matched (block 402) and so on until the desired value U2 is reached. When the datum value entered in block 404 is to reduce the frequency (df<0), the variation df demanded is applied first, the voltage can be matched subsequently without risking underpowering the motor, since the latter would, in contrast, be overpowered for a very short while, the state of the system being brought back very rapidly to the maximum efficiency point by virtue of the characteristic according to the invention described on the basis of FIG. 3a.

Figure 5:
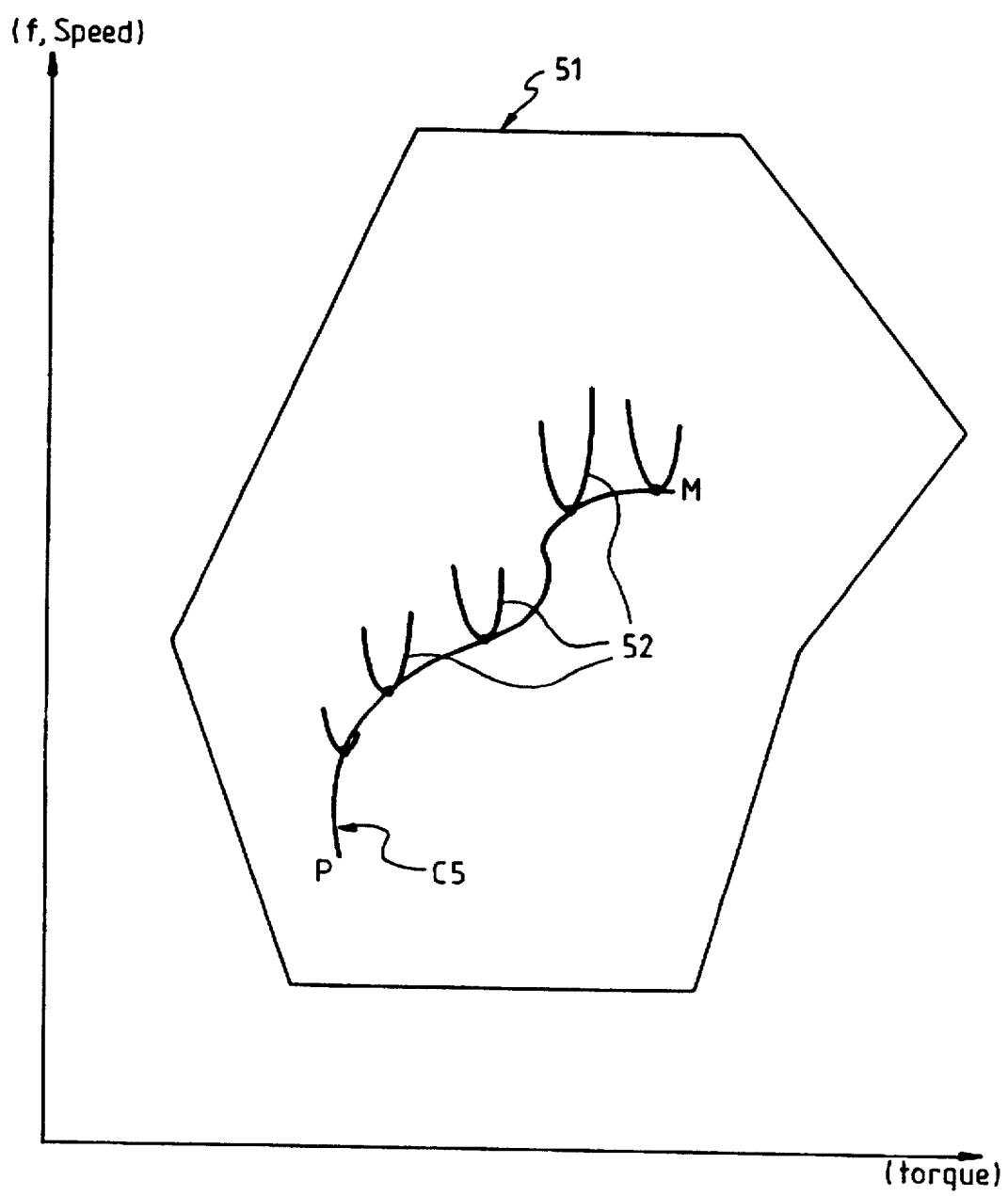
FIG. 5 represents the path according to the invention, followed by successive transient regimes within the operating region of a load.

An example of the application of these flow charts is represented in FIG. 5. In this figure the operating region 51 of the motor is represented, consisting of discrete points 52 representing the operating points of the device (magnitude homogeneous with torque on the abscissa and with the speed of rotation of the motor on the ordinate), and the curve C5 represents any path (PM) or (MP) when P and M are the two steady-state regime points consisting of a succession of transient regimes for which, at each point, the evolution of the system is taken into account, according to one of the flow charts of the preceding FIGS. 4a and 4b described above by auto-adaptive management according to the invention above.

There is a specific transient regime which is the starting of the motor driving an application. By analogy with another inductive-type load such as, for example, loads of the static converter type, whether variable or not, or even transformers supplying electric motors, this starting phase is equivalent to first switching on this load. One of the problems encountered by the person skilled in the art in the course of starting is that the currents absorbed in order to overcome the opposing torque, or currents drawn, may have very high values with respect to the values of the currents absorbed during a steady-state regime or a transient regime between two steady-state regimes. These absorbed current peaks can contaminate the power supply mains and/or impose oversizing on the components of the device.

After having overcome the starting torque, the motor has to increase the drive speed of the application up to a first operating point. The invention proposes two means of controlling the acceleration of the motor.

Figure 6:
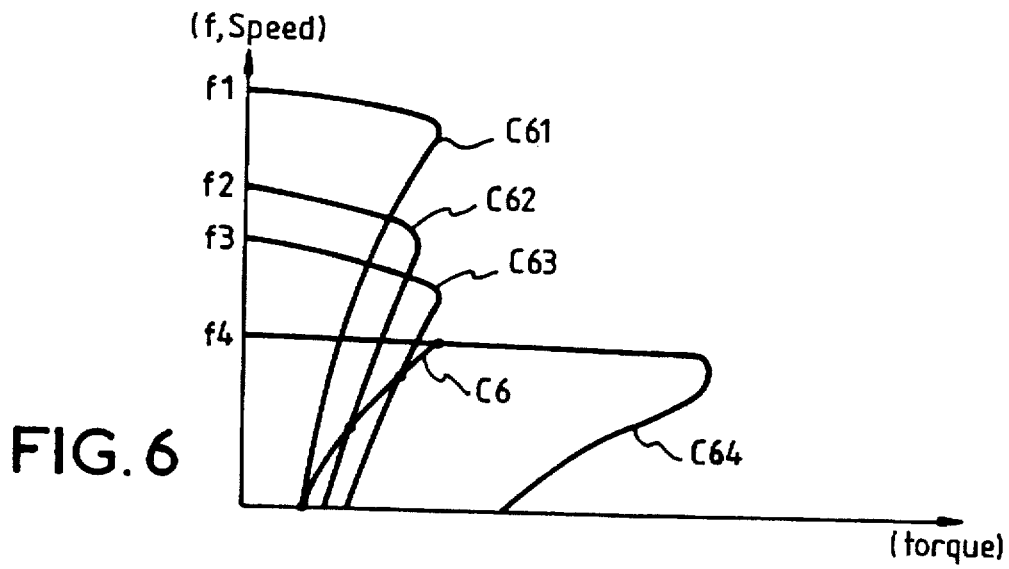
FIG. 6 represents the starting of a motor according to the invention by reducing the frequency delivered.

The first means according to the invention is to carry out starting by reducing the frequency as is represented in the example for starting an asynchronous motor in FIG. 6, in which, on the abscissa, there are represented the torques and, on the ordinate, the frequency of the fundamental of the voltage delivered to the motor or the speed of the motor. The person skilled in the art will understand that this starting technique by frequency reduction is inapplicable to motors lacking asynchronous components. At the initial instant t0 a datum frequency f1 is sent to the motor, this frequency being higher than that which corresponds to the operating point to be reached, accompanied by the voltage which is appropriate to overcome the opposing torque on starting. Next, by progressive management of the voltage and of the frequency, the latter progressively reduces from f1 to f4, passing through f2 and f3 until the value of the frequency corresponding to the first steady-state regime or to a very close value is reached. The curve C6 is the speed-torque characteristic of any application for these operating points, and the curves C61, C62, C63 and C64 the speed-torque characteristics of the motor. The law of progression of the torques (Um,f) as a function of time may be chosen on the basis of the desired acceleration law.

Figure 7:
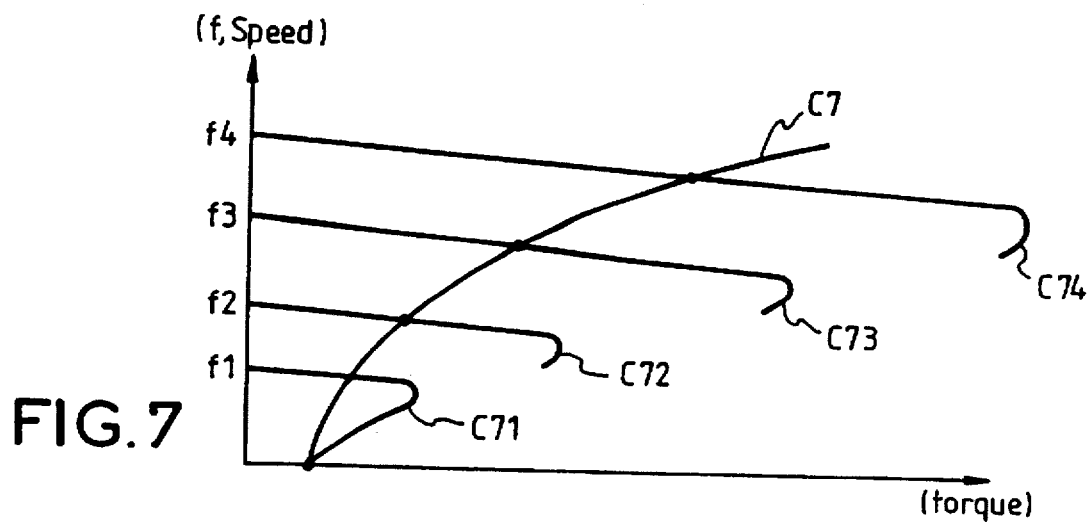
FIG. 7 represents the starting of a motor according to the invention by increasing the frequency delivered.

The second means according to the invention is to carry out starting by increasing the frequency as represented, for example, for the starting of an asynchronous motor in FIG. 7, on which, on the abscissa, are represented the torques and, on the ordinate, the frequency of the voltage fundamental at the terminals of the motor or the speed of the motor. At the initial instant t0 the motor is sent a voltage wave at frequency f1 which is lower than that corresponding to the operating point to be reached, accompanied by the corresponding voltage so as to overcome the opposing torque on starting. Then, by progressive management, the frequency is increased up to f4, passing through f2 and f3 until reaching the value corresponding to the first steady-state regime to be reached, the curve C7 being the speed-torque characteristic of an application and the curves C71, C72, C73 and C74 the speed-torque characteristics of the motor. According to this technique, the voltage is matched, at any instant, by the method according to the invention in order to ensure the most exact supply of power to the motor, this making it possible continuously to control the power, the current absorbed and the acceleration if necessary.

Figure 8:
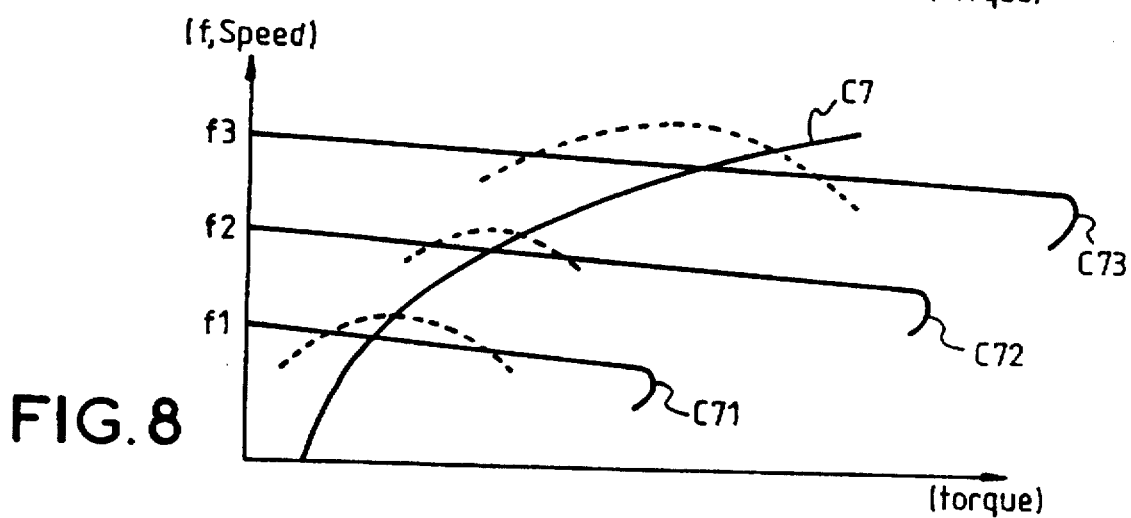
FIG. 8 represents the starting of a motor according to the invention by increasing the frequency and the corresponding optimal efficiencies.

An additional advantage of the present invention stems from the fact of carrying out the starting by increasing the frequency. In fact, this makes it possible to make the motor work more rapidly at a speed higher than that of its drop-out torque, and to slave the voltage of the motor by making it work in the near vicinity of its optimal efficiency, including in acceleration phase. This slaving makes it possible further to reduce the power absorbed on starting and thus to reduce the currents drawn from the mains and in the device on starting. The peak of the curves in dotted lines in FIG. 8 represents the optimal efficiency of the motor.

According to the invention, the end of starting may be decided by two different means:

either a time delay is fixed with a safety margin according to the knowledge of the behavior and the dispersions in producing the characteristics of the process to be driven, or, by virtue of the current or an equivalent physical quantity, the end of the acceleration phase being detected when the current drawn by the motor decreases.

After the acceleration phase, two cases can be envisaged:

the torque of the first operating point corresponds to the end-of-acceleration-phase torque, or the torque of the first operating point is different from the end-of-acceleration-phase torque, such as, for example, in the case of the priming of a pump when it is first switched on, of a refrigeration circuit when the pressure differential is established with a delay with respect to the instant of starting, of a delayed clutch engagement, of a centrifugal pump, of machine tools such as, for example, a lathe or a milling machine for which the starting takes place with the tool not engaged, or for any device put into action by centrifugal effect.

At the end of the acceleration phase, if the torque supplied by the motor were lower than the opposing torque of the load corresponding to a first operating point and no action were taken on the power supply, the motor not being overpowered due to account being taken of the progression in the state of the system during the acceleration phase as described above, the motor would risk stalling. According to the invention, two techniques exist which make it possible to avoid this problem.

The first consists, when the parameters of the first operating point corresponding to the steady-state regime are known or predictable, in applying directly to the motor the voltage Um corresponding to this operating point at the end of the acceleration phase. This technique can be envisaged, whether an increase or a reduction in the frequency has been used, as is explained above.

Figure 9:
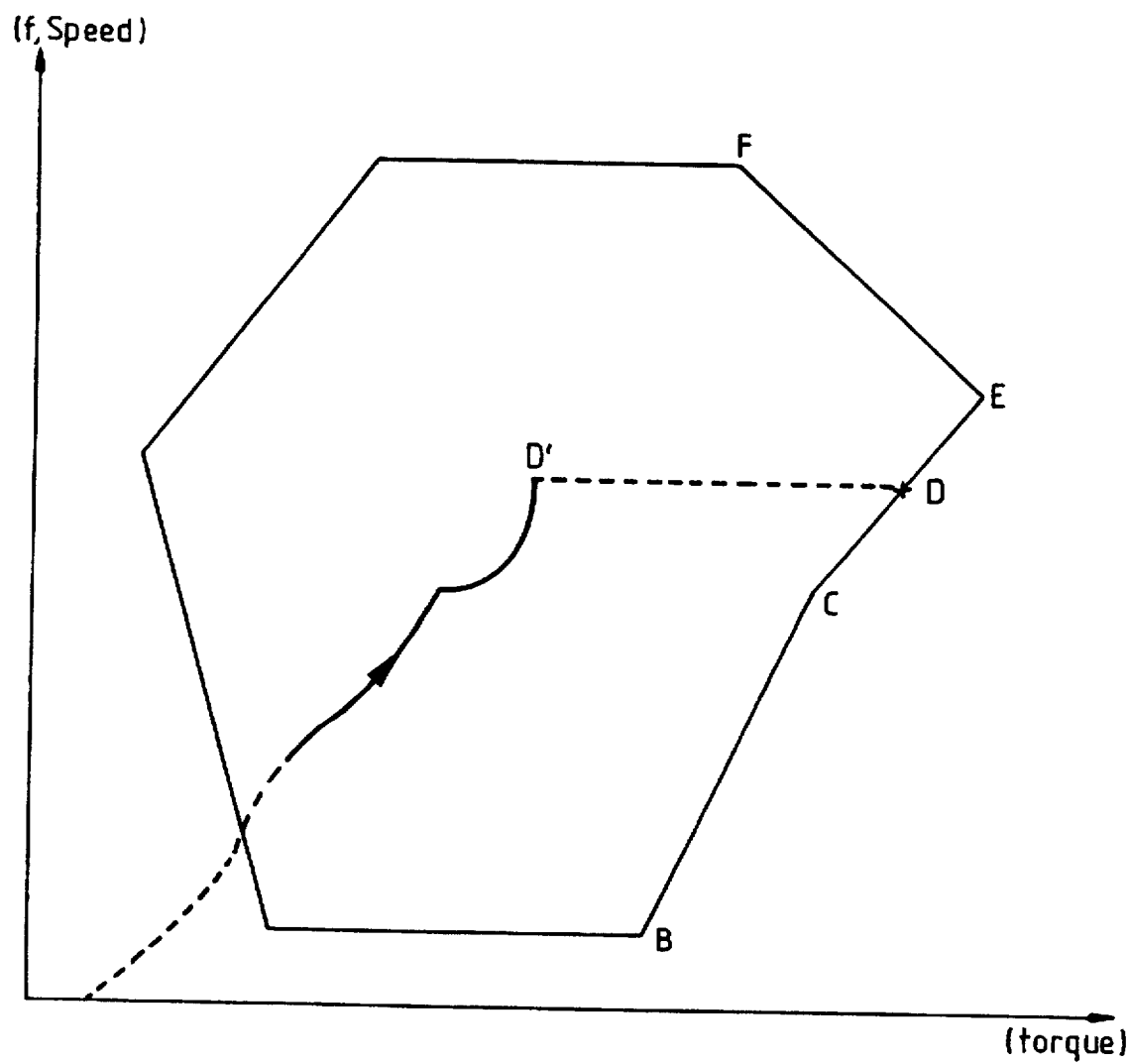
FIG. 9 represents the path followed by successive transient regimes in the presence of a buffer phase within the operating region.

The second technique according to the invention, in the case in which the parameters of the first operating point corresponding to the steady-state regime are not known or not predictable, is to make up a buffer phase between the acceleration phase and the method for managing the steady-state regimes. Within the operating region, a point D' being the point to be reached in steady-state regime as represented in FIG. 9, and for which the descriptive parameters are unknown, the parameters corresponding to those of the point D are chosen by default. The torque corresponding to the point D is the highest likely to be reached at the rotational speed required in steady-state regime. The motor, at the terminals of which the voltage UmD corresponding to the torque of point D will be applied, will be overpowered during this buffer phase, but the rapidity of intervention of the method of managing the steady-state regimes according to the invention, described on the basis of FIG. 3a, will make it possible rapidly to reach the power supply conditions appropriate for the point D', the actual operating point for the application and for the motor, to which the voltage UmD'<UmD corresponds. The duration of oversupply of the motor will be very short, whether an increase or a reduction in the frequency is used. In the more general case of inductive-type loads of the static converter type, whether variable or not, or even supplying electric motors, the first switch-on includes a buffer phase preceding the procedure for the steady-state regimes, during which these loads have a voltage applied corresponding to an operating point the power of which is the highest likely to be reached in steady-state regime.

In one preferential configuration of the invention, such as represented in FIG. 9, it is possible, in the two preceding cases, to adjust the frequency so that, at the end of the acceleration phase, the frequency is as close as possible to the frequency fmD' corresponding to the point D', so that the variation due to the frequency change is negligible, whether an increase or a reduction in the frequency is used.

Another preferential embodiment of the invention consists in choosing not the point D as potential "aiming" point, but a point more compatible with the requirements of acceleration time. As a function of the speed to be reached after acceleration, any point situated on the portion (B,C,D, E,F) can be chosen, since this portion represents the site of maximum torques envisagable as a function of the speed of rotation. A criterion for the choice adopted may be the minimization of the oversupply to the motor. In order then to reach the actual operating point (point D' in FIG. 9) the procedure as described above on the basis of FIG. 5 is used.

For implementing the present invention, a waveform applied to the terminals of the motor which is particularly well adapted to good efficiency of the latter and of its power supply device is an alternating voltage wave a half-period of which has an isosceles trapezoidal shape, the plateau having a duration of T/6, when T is the period of the wave. The chopping frequency during the rising and falling ramps of the half-period is preferably greater than 10 kHz. The advantages of such a waveform are described in a French Patent Application entitled "Method of supplying power for an inductive load and device for implementing this method" filed by the Applicant on the same day as the present application.

A preferential static converter structure for implementing the present invention is represented in FIG. 12 and is the combination of a voltage step-up active filter and of an apparent voltage step-down inverter element seen by the motor. Such a structure is described in the French Patent Application entitled "Structure of a static frequency converter" filed by the Applicant on the same day as the present application.

Such a static frequency converter is controlled by a monitoring parameter processing and control signal derivation element 123 to which datum values 1216 are applied, and includes an active filter 122 at the terminals of an inverter means 124 and supplies a load 125. A rectifier means of the diode bridge type 121 takes in a power supply wave Ue and delivers a rectified wave Ur to the terminals of the active filter 122. This active filter consists of an inductor L1 in series with a diode D1, both linked to earth by a capacitor CO and a switch K5 controlled by the element 123. This active filter 122 delivers a voltage E to the terminals of the inverter means 124 which comprises at least one complete bridge, one of whose arms includes two capacitors C1 and C2, and the other arm two switches K1 and K2, the load 125 of the motor type is connected between the switches K1 and K2 on the one hand and between the capacitors C1 and C2 on the other hand. By virtue of the element 123 controlling the switches by means of the connections 129 and 1210, and implementing a method of the PWM type according to the invention, the inverter means 124 delivers a voltage Um to the terminals of the motor 125. This voltage Um includes a component UmLF which is the voltage from the point of view of the low frequencies and UmHF which is the voltage from the point of view of the high frequencies. The capacitors C1 and C2 have voltages V1 and V2 respectively at their terminals. This device powers a single-phase motor but may be extended to supply power to a multiphase motor.

The blocks B1 to B6 are the monitoring parameters processed by the element 123 by means of connections 1212 and are physical quantities measured on the power supply source Ue, on the output of the rectifier means 121, on the active filter 122, on the inverter means 124 and/or on the motor 125. These measureable physical quantities may be voltages, currents, powers, temperatures, movements, speeds, accelerations, pressures, magnetic fields and/or electric fields. Preferably, a monitoring parameter will be a value which is an image of the distortion dUmLF of the voltage UmLF at the terminals of the motor.

By virtue of this structure, the active filter 122 may be controlled in such a way as to behave like a voltage step-up device and/or the inverter element 124 may be controlled in such a way that the magnetic flux of the motor 125 behaves as if the inverter element 124 behaved as a voltage step-down device.

Among the numerous advantages of this structure, some are particularly beneficial, such as the fact that this structure does not contaminate the mains, that it makes it possible completely to overcome fluctuations in the power supply source Ue from the converter and offers, as setting-up parameters, in addition to the various measureable physical quantities set out above, the ripple factor of the voltage at the terminals of the capacitors of the inverter element, the latter giving the image of the undulations in the opposing torque of a fluctuating load.

The setting-up parameters may, for themselves, be the closing time ton of the switch K5 of the active filter so as to adjust the DC voltage E at the terminals of the inverter element, as well as the apparent percentage %Um of E seen by the motor by virtue of the PWM method slaving the switches of the inverter element.

Figure 10:
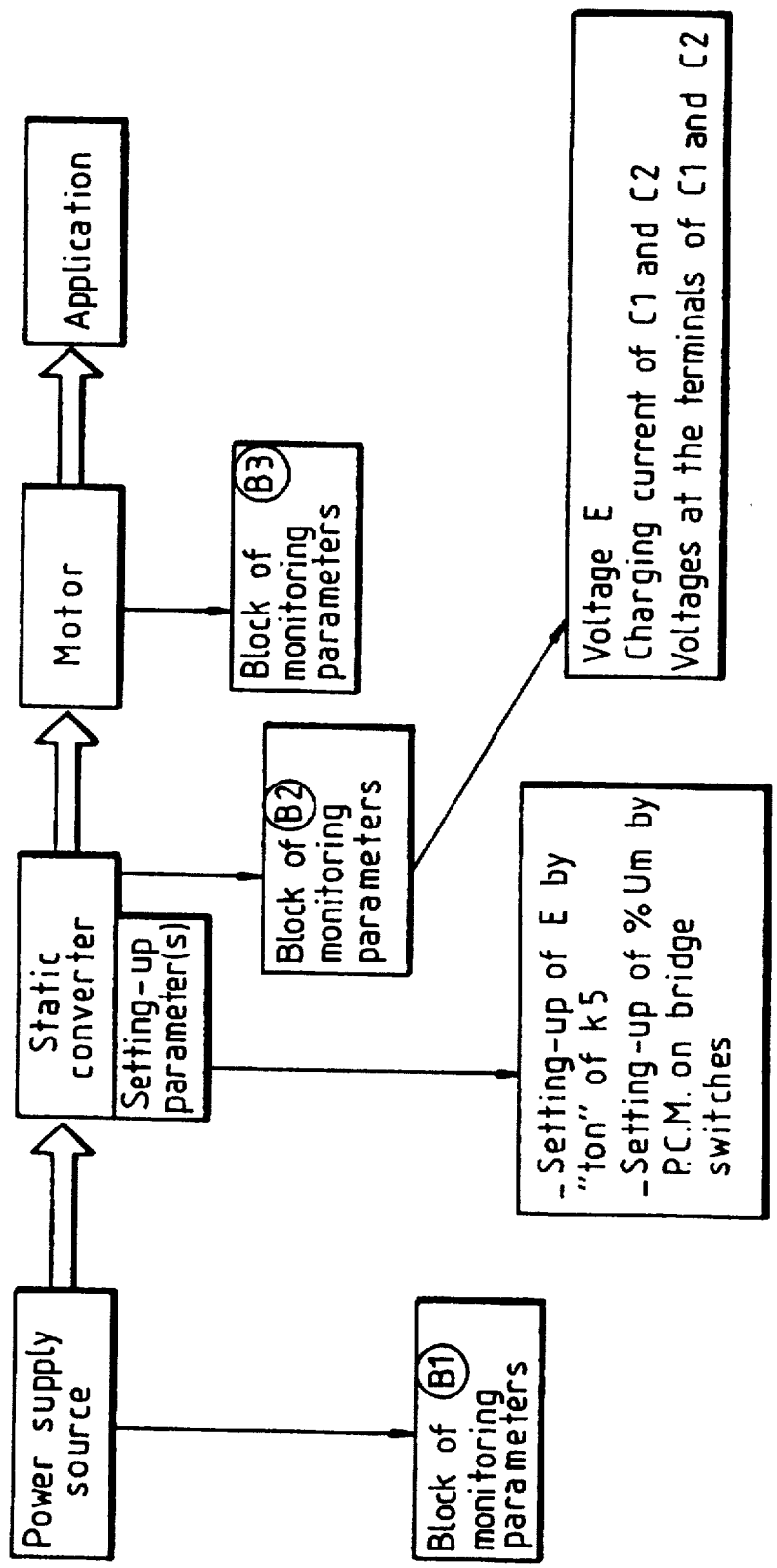
FIG. 10 represents the acquisition of monitoring and setting-up parameters in one preferred configuration of the invention.

FIG. 10 represents the localizing of the monitoring and setting-up parameters which appear in the case of a converter structure as previously described.

By virtue of such a device, in the case of steady-state regimes, adjusting the voltage at the terminals of the motor on the basis of the concave form of the current and of the power absorbed by the motor, as represented in FIG. 3a, corresponds to adjusting the DC voltage E and %Um on the basis of the direction of variation of the chosen monitoring parameters MP. There is near infinite choice for E and %Um leading to the same voltage UmLF at the terminals of the motor, since it is possible either to chop a higher voltage E more, or to chop a lower voltage E less. The choice can be made depending on taking two criteria into account, the level of distortion of the voltage at the terminals of the motor and/or the minimizing of the losses in the power elements of the converter corresponding to minimum E.

In the case of transient regimes, such a converter structure allows, independently of the compensation for fluctuation of the application, E to be raised in order then to slave %Um while offering the flexibility necessary to follow the transient regimes from one operating point to another, while continuing to deliver an optimal voltage to the motor, the optimizing of E possibly being done more slowly in step with the progress of the process, or on return from a new steady-state regime.

Moreover, in the case of starting the motor, at t=0, the effective instant of starting of the motor, such a structure makes it possible to deliver, from this instant, the voltage UmLF necessary for the motor to overcome the opposing torque on starting, by precharging the capacitors C1 and C2 of the inverter element up to the desired value E independently of the state of the power supply source, either by the sole action of the switch K5 of the step-up device 122 while the switches K1 and K2 of the inverter element 124 are held open, or by the combined action of K5 and of K1 and K2 driven by the PWM procedure in such a way as to deliver to the motor a wave with duty cycle ½, the motor then remaining stopped since it behaves as if it saw a zero voltage UmLF. It suffices subsequently to make %Um progress to respect one of the laws of progression described above. This characteristic may be extended by analogy to all the inductive-type loads by making it possible to produce the current and/or the power which are necessary when first switching on the load.

An additional advantage of the present invention is that it ensures repeatability of the starting in optimal conditions since, whatever the state of the power supply source, the voltage delivered to the motor is guaranteed, and the currents drawn are thus minimized.

Figure 11:
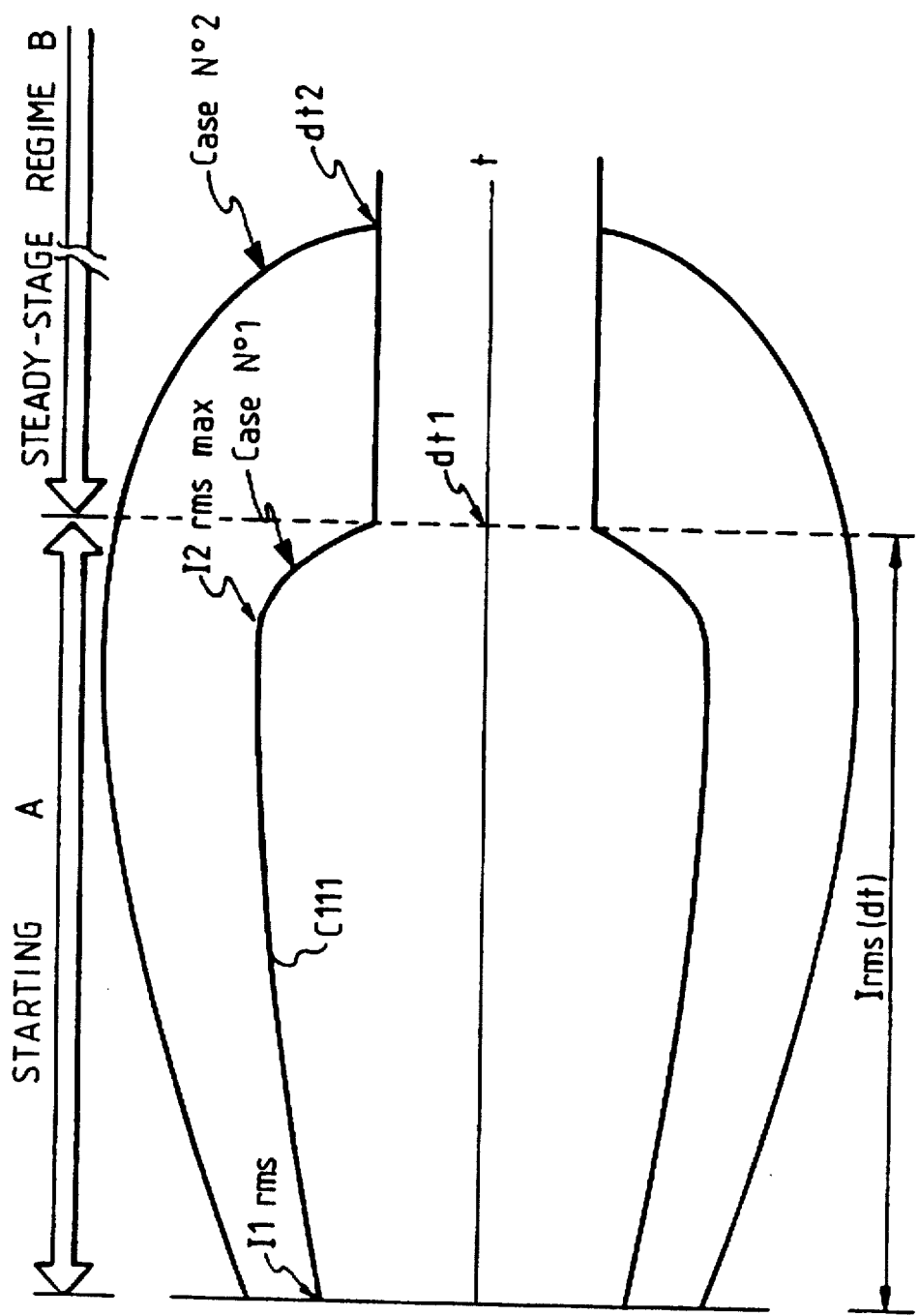
FIG. 11 represents the envelopes of starting currents as a function of the initial charging state of the capacitors according to the invention.

FIG. 11 illustrates the principle of starting A and of the currents drawn in order to arrive at the steady-state regime B. When the initial charging conditions of the capacitors C1 and C2 have been fulfilled according to the principle set out above, the starting time is dt1 and the curve C111 represents the envelope of the instantaneous current Imrms drawn. In the case in which these initial conditions are not adhered to, the rms currents I1rms, Imrms and I2rms increase, and with them the time necessary for the starting dt1 which becomes dt2.

Another advantage of the present invention may be that of starting with the voltage E strictly necessary at the terminals of the capacitors C1 and C2 so as to avoid overstressing the power switches of the inverter element. Moreover, acting in accordance with the present invention makes it possible to avoid having recourse to a superfluous increase in the values of C1 and C2 for the sole purpose of starting. In fact, if starting is carried out by increasing the frequency, the first frequencies used may dictate high values of variations dV at the terminals of the capacitors C1 and C2.

The energy supplied to the capacitors C1 and C2 directly suffers the ripple from the rectified mains, and a simple means of keeping control of this effect consists in synchronizing the control of the switches of the inverter element so that, at the fundamental frequency of the motor voltage, the maximum energy is demanded from the capacitors in the time ranges for which the mains is high, which amounts to taking full advantage of C1 and C2 on starting.

The second method, in the case of starting by frequency reduction, makes it possible to make C1 and C2 work in conditions limiting the voltage variation dV at their terminals. It is then possible, by virtue of the combined action of the step-up and apparent step-down functions to reduce E for the same voltage Um to be delivered to the motor, the variation dV being smaller on C1 and C2.

In the case in which a torque offset exists between the end of the acceleration and the first steady-state regime point, the present invention allows great flexibility in tracking, without an undesirable influence on the power supply source, including when the torque demanded from the motor once the inertia is overcome is unknown.

It will be possible to make E have a sufficiently high value to allow the motor to operate, including in the sternest conditions of the operating region as represented in FIG. 9. Moreover, at the end of the acceleration phase, %Um may be adjusted to the value corresponding to the chosen point corresponding to the highest torque or the contour of the operating region. Subsequently, the near instantaneousness of slaving of %Um by virtue of the method according to the invention in order to obtain the optimal voltage Um for the steady-state regimes makes it possible to reduce the time for which the motor is oversupplied.

The method of supplying optimal power, as well as the device implementing it according to the present invention, applies to all types of loads of an inductive nature, such that the ratio of the power which they supply to the power which they absorb, at a given frequency, exhibits a maximum as a function of the voltage UmLF which is delivered to them as input, such as, for example, asynchronous, synchronous, synchronized asynchronous alternating-current electric motors, with or without a variable reluctance-type contribution, single-phase or multi-phase, and, by analogy with the electric motors quoted, static converters, whether variable or not, or even transformers supplying electric motors.

What is claimed is:

1. A system for supplying optimal power from a power supply source to an inductive-type load coupled to an application, said system comprising:
   a static frequency converter including an active filter connected at terminals of an inverting means supplying said load, said active filter comprising an inductor with two terminals, in series with a diode, said terminals being linked to ground respectively through a capacitor and a first switch, and said inverting means comprising at least one complete bridge having two arms, one of said arms including two capacitors and the other of said arms including two further switches; said load being connected to junction points between said two capacitors and said two further switches respectively; and monitoring parameter processing and control signal generation means for providing set parameters applied to said static frequency converter for controlling said first switch and said further switches according to a high-frequency pulse width modulation-type procedure, said monitoring parameter processing and control signal generation means receiving and processing monitoring parameters for providing a measurement of the direction of variation, around an extreme, of at least one of said processed monitoring parameters so as to provide said set parameters with values which are a function of said direction of variation so that a low frequency component UmLF of a voltage delivered by said converter to said load corresponds to a minimum power absorbed by said load.

2. A system as claimed in claim 1, wherein said inverting means includes a single complete bridge and supplies power for a single-phase load.

3. A system as claimed in claim 1, wherein said inverting means includes two complete bridges and supplies power for a two-phase load.

4. A system as claimed in claim 1, wherein, before a first switch-on phase, said capacitors are precharged with a predetermined voltage independent from said power supply source, said monitoring parameter processing and control signal generation means being such that, before said first switch-on phase, they provide set parameters for performing a combined action on said first switch and said further switches where said inverting means is driven according to a pulse width modulation-type procedure such that a wave with a duty cycle of ½ is delivered to said load.

5. A system as claimed in claim 4, wherein said inductive-type load is an electric motor and said predetermined voltage is the voltage necessary supplying to the motor a power needed to overcome opposing torque generated during starting of said motor.

6. A system as claimed in claim 1, wherein one of said monitoring parameters is a representation of a ripple factor of the voltages at terminals of said two capacitors of said one arm and wherein said monitoring parameter processing and control signal generation means includes means for measuring the variations of said one monitoring parameter and means for regulating said set parameters as a function of said variations so as to match the motor torque to variations of the load around an operating point in a steady-state regime.

7. A method for supplying optimal power to an inductive-type variable-speed load coupled to an application when the load is driven by a static converter controlled by an electronic module, said method comprising the steps of:

monitoring measurable physical parameters of at least one of said load, said static converter and a power supply source;

performing at least one of weighting and combining said physical parameters for generating at least one resulting value and providing a measurement of the direction of variation of said resulting value, around an extreme corresponding to a minimum power absorbed by said load;

providing a number of set parameters applied to said converter for said converter to deliver a voltage Um to said load according to a high-frequency pulse width modulation-type procedure, said set parameters having values which are a function of said direction of variation so that a low frequency component UmLF of said voltage Um corresponds at each moment to said minimum power absorbed by said load;

wherein for a steady-state regime corresponding to a given operating point, the frequency of said component UmLF remains constant.

8. A method as claimed in claim 7 wherein one of said measurable physical parameters is a monitoring parameter which is a representation of a current absorbed by said load and wherein said method comprises in addition the steps of:

providing a measurement of the distortions exhibited by said monitoring parameter;

regulating said set parameters as a function of said distortions so as to match the motor torque to variations of the load.

9. A method as claimed in claim 7, wherein one of said measurable physical parameters is a monitoring parameter which is a representation of asymmetries between positive and negative half-cycles of a current absorbed by said load and wherein said method comprises in addition the steps of:

providing a measurement of the variations exhibited by said monitoring parameter;

regulating said set parameters as a function of said variations so as to match the motor torque to variations of the load around the operating point.

* * * * *